United States Patent [19]

Nola et al.

[11] 3,760,248

[45] Sept. 18, 1973

[54] INDUCTION MOTOR CONTROL SYSTEM WITH VOLTAGE CONTROLLED OSCILLATOR CIRCUIT

[75] Inventors: Frank J. Nola; James R. Currie; Harry Reid, Jr., all of Huntsville, Ala.

[73] Assignee: The United States of America as represented by the Administrator of the National Aeronautics and Space Administration

[22] Filed: Jan. 19, 1972

[21] Appl. No.: 218,965

[52] U.S. Cl. .................. 318/230, 307/271, 318/231, 318/341, 331/135

[51] Int. Cl. .................. H02p 5/34

[58] Field of Search .................. 318/227, 230, 231, 318/341; 307/228, 261, 271; 331/135, 136, 108 C, 108 D; 328/150

[56] References Cited

UNITED STATES PATENTS

| | | | |
|---|---|---|---|
| 3,662,247 | 5/1972 | Schieman | 318/227 X |
| 3,529,223 | 9/1970 | Vergez, Jr. | 318/230 |
| 3,649,845 | 3/1972 | Foch | 307/228 |
| 3,594,649 | 7/1971 | Rauch | 307/271 |
| 3,659,168 | 4/1972 | Salihi et al. | 318/227 |
| 3,482,116 | 2/1969 | James | 307/228 X |
| 3,278,737 | 10/1966 | Germain | 307/261 X |

*Primary Examiner*—J. D. Miller
*Assistant Examiner*—H. Huberfeld
*Attorney*—L. D. Wofford, Jr. et al.

[57] ABSTRACT

A voltage controlled oscillator circuit, single or two phased, in which there is employed a first and second differential amplifier, the first differential amplifier being employed as an integrator for developing equal and opposite slopes proportional to an input voltage, and the second differential amplifier functioning as a comparator to detect equal amplitude positive and negative selected limits and providing switching signals which gate a transistor switch which switches the integrating differential amplifier between charging and discharging modes, whereby there is provided an output of the first differential amplifier which is triangular and which upon the application of wave shaping provides a substantially sinusoidal output signal. A two phased version, adds a second, like, integrator which is switched between charging and discharging modes by a zero crossing detector responsive to the output of the first integrator to provide a second, 90° phase shifted, output.

5 Claims, 3 Drawing Figures

INDUCTION MOTOR CONTROL SYSTEM WITH VOLTAGE CONTROLLED OSCILLATOR CIRCUIT

ORIGIN OF THE INVENTION

The invention described herein was made by employees of the United States and may be manufactured and used by or for the Government of the United States of America for Governmental purposes without the payment of any royalities thereon or therefor.

BACKGROUND OF THE INVENTION

This invention relates to voltage controlled oscillator circuits and particularly to an improved such circuit which is readily adaptable to the generation of dual outputs displaced 90° in phase, and such as, for example, employed in the construction of two-phase motor control circuits.

GENERAL DESCRIPTION OF THE PRIOR ART

Heretofore the generation of two 90° phase displaced signals at frequencies varying as a function of a control voltage has generally involved one or two approaches. In one, a conventional voltage controlled oscillator (V.C.(.) employs a variable reactance controlled resonant circuit to convert a D.C. signal to a varying frequency A.C. signal. A second signal, displaced 90° in phase, is then derived from the first signal by means of a reactance network. The difficulty with this approach is that reactance networks are frequency sensitive and provide only an accurate 90° phase shift for a limited range of frequencies. The second approach is to square the sine wave output of the V.C.O. and employ logic circuitry to obtain two timed square waves which are related in phase by 90°. These square waves are then subjected to wave shaping techniques to provide an output approximating two sinusoidal waveforms, differing in phase by 90°. The difficulty of this approach is that it requires fairly complex circuitry and is expensive.

SUMMARY OF THE INVENTION

Accordingly, it is an object of this invention to provide an improved voltage controlled oscillator and control circuits employing same, of improved accuracy, of low cost, of excellent efficiency and of extreme reliability.

In accordance with the invention a voltage controlled oscillator is constructed of a dual sloped integrator, a comparator, and a switch wherein the comparator detects equal and opposite selected excursions of the output of the integrator and controls the switch which in turn switches the integrator between rising slope modes and descending slope modes. As a further feature of the invention a zero crossing detector, a second integrator and a second switch are added. The zero crossing detector is driven by the output of the first integrator and applies switching signals to the second switch to cause it to switch slope modes of the second integrator coincident with a crossing of the origin of the output of the first integrator. With these additions a two phased voltage controlled oscillator is provided wherein the first phase voltage is available at the output of the first integrator and the second, 90° displaced phase, voltage is available at the output of the second integrator. As a still further feature of the invention the two phased version of the invention is included in a motor control circuit wherein an AC induction motor is controlled as a function of slip frequency.

DESCRIPTION OF THE PREFERRED EMBODIMENT

Figure 1:
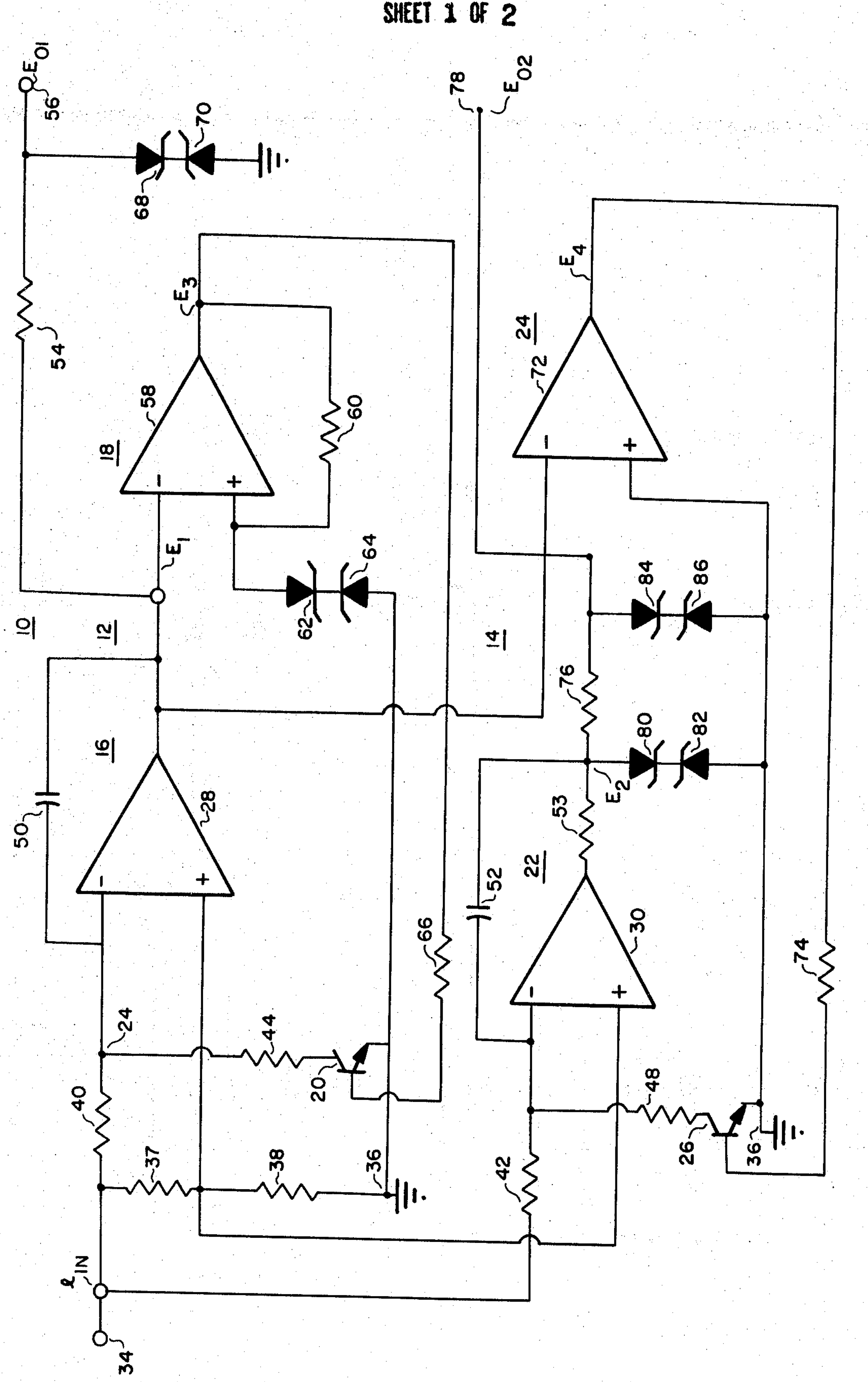
FIG. 1 is an electrical schematic diagram of a two-phase voltage controlled oscillator embodying the invention.

Oscillator circuit 10 consists basically of reference phase oscillator 12 and 90° shifted phase oscillator 14. Reference oscillator 12 in turn basically consists of integrator 16, comparator 18 and transistor switch 20. Oscillator 14 basically consists of integrator 22, zero crossing detector, or squaring circuit, 24 and transistor switch 26. Integrators 16 and 22 are identical, having like differential amplifiers 28 and 30 fed from common input terminals 34 and 36 (ground).

Figure 2:
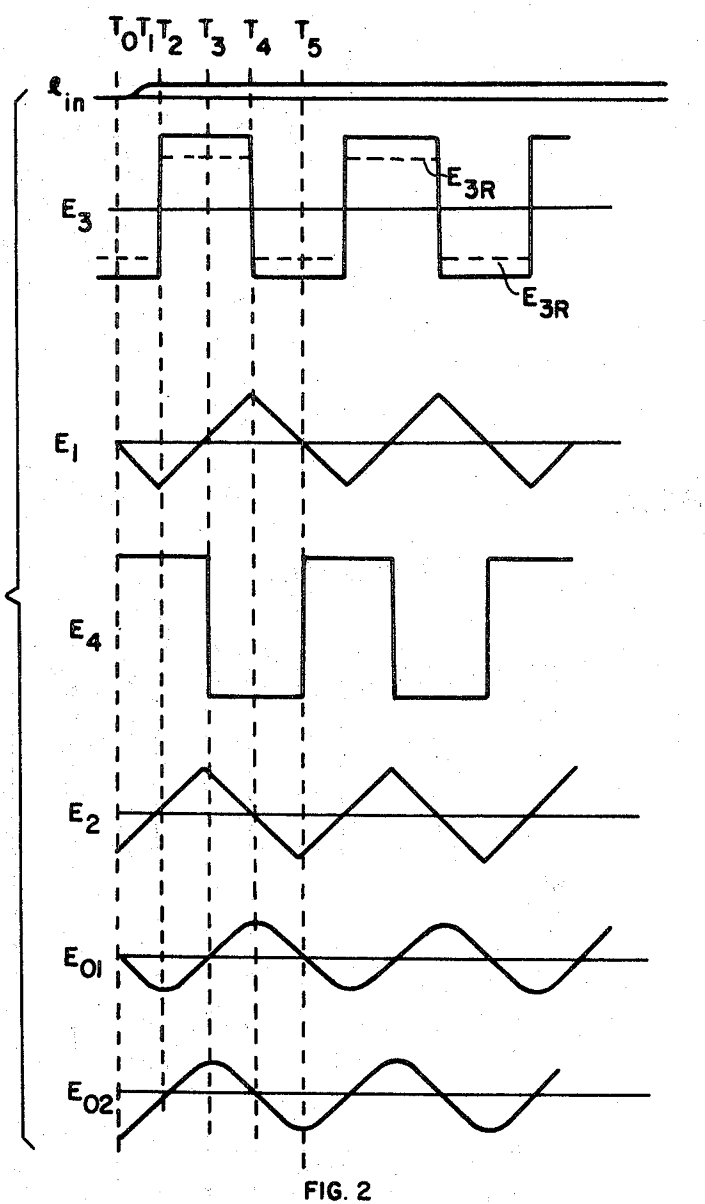
FIG. 2 is a graphical representation of waveforms pertinent to the operation of the invention.

The input voltage $e_{in}$ to the circuit (FIG. 2) is equally divided by equal value resistors 37 and 38 connected across input terminals 34 and 36 with the full input voltage being applied through like value resistors 40 and 42 to the minus or inverting inputs of differential amplifiers 28 and 30, respectively. One half of the input voltage, appearing at the intersection of resistors 37 and 38 is applied to the plus or non-inverting inputs of both differential amplifiers 28 and 30. Resistor 44 is connected between the inverting input of differential amplifiers 28 through transistor switch 20 to reference potential ground terminal 36 and resistor 48 is connected from the inverting input of amplifier 30 through transistor switch 26 to ground terminal 36. Integrating capacitors 50 and 52 are of equal value, capacitor 50 being connected between the output and inverting input of differential amplifier 28 and capacitor 52 being connected through output current limiting resistor 53 between the output and inverting input of differential amplifier 30. The output $E_1$ of differential amplifier 28, and thus of integrator 16, provides the reference phase output through current limiting resistor 54 to output terminal 56 and inputs to comparator 18 and zero crossing detector 24.

Comparator 18 employs differential amplifier 58, to which positive feedback resistor 60 is connected between the output and non-inverting input. Back-to-back Zener diodes 62 and 64 are connected between the non-inverting input of differential amplifier 58 and ground and function as a bi-polarity voltage regulator.

The input to differential amplifier 58 is applied to the inverting input and the output is applied through resistor 66 to the base input of transistor switch 20. Back-to-back Zener diodes 68 and 70 are connected between output terminal 56 and ground and function to truncate the otherwise triangular wave output $E_{01}$ of integrator 16.

Zero crossing detector 24 employs differential amplifier 72 with its input applied on its inverting input terminal and its output being applied through resistor 74 to the base input of transistor switch 26. The non-inverting input of differential amplifier 72 is grounded. The output $E_{02}$ of 90° shifted phase oscillator 14 is supplied from the output of differential amplifier 30 through resistor 53 and resistor 76 to output terminal 78.

Back-to-back Zener diodes 80 and 82, connected between the output of integrator 22, at the intersection of resistor 53 and 76, and ground are of the same value as Zener diodes 62 and 64 and thus provide the same stable voltage limits on the output signal from differential amplifier 30 as provided from the output of differential amplifier 28. Resistor 53 functions to provide a desired current level to Zener diodes 80 and 82 and thus provide the same stable voltage limits of the output signal $E_2$ from differential amplifier 30 as provided by the output $E_1$ of differential amplifier 28. Resistor 76 functions to provide a desired current level to Zener diodes 84 and 86 which function as do Zener diodes 68 and 70 to truncate the output signal $E_{02}$. In the illustrated example, Zener diodes 62 and 64 and 80 and 82 set slope switching voltage to nine volts and Zener diodes 68 and 70 and 84 and 86 cut off or truncate the output voltages at six volts.

Differential amplifiers 28, 30, 58 and 72 are standard operational amplifiers wherein the output voltage $$e_o = -e_{in}\ Z_f/Z_i \tag{1}$$

where $Z_f$ is the feedback transfer impedance, $Z_i$ is the input transfer impedance and $e_{in}$ is the voltage applied to the input terminal to which the input impedance $Z_i$ is connected and the input terminal is the inverting (−) terminal of the operational amplifier. For voltages applied directly to the non-inverting (+) input terminal, the output may be represented as:

$$e_o = e_{in}\ (1 + Z_f/Z_i) \tag{2}$$

Differential amplifier 58 of comparator 18 has a relatively high gain and its output is either fully positive or fully negative depending upon the voltage level and polarity of voltage of the $E_1$ output of differential amplifier 28, which is applied to the inverting input of differential amplifier 58. The output voltage $E_3$ of differential amplifier 58 provides through resistor 60 and Zener diodes 62 and 64 a maximum, plus or minus, voltage of nine volts at its non-inverting input. As explained above, the function of differential amplifier 58 is to turn transistor switch 20 off or on. If $E_1$ applied to the inverting input of differential amplifier 58 is greater than the fixed nine volt reference level at the non-inverting input, then the output of the differential amplifier switches to a maximum minus voltage and turns off transistor switch 20. If $E_1$ falls below the reference level at the non-inverting input of differential amplifier 58, then the output switches to a positive value and a "turn on" current flows through resistor 66 to transistor switch 20 causing it to effectively ground the lower end of resistor 44 and cause integrator 16 to switch slopes of integrating mode as will be further explained below.

The equations for determining the output of differential amplifier 28 are as follows. First, assuming that switch 20 is turned off, the feedback and input transfer impedances of differential amplifier 28 are computed as follows:

$$Z_f = 1/CS \tag{3}$$

where $S$ is the LaPlace operator $$Z_{in} = 2R_1 \tag{4}$$

Where $R_1$ is the value of resistor 40.

Referring to Equations 1 and 2

$$E_1 = -e_{in}\ 1/2R_1CS + e_{in}/2\ (1 + 1/2R_1CS) \tag{5}$$

simplifying $$E_1 = -e_{in}/4R_1CS + e_{in}/2$$

with transistor switch turned on:

$$Z_f = 1/CS \tag{7}$$

$Z_{in}$ with respect to the inverting input is $2R_1$. Since resistor 44 is now at ground, the transfer impedance with respect to the non-inverting input is:

$$Z_{in} = (2R_1 \times R_1/R_1 + 2R_1) = 2/3\ R_1 \tag{8}$$

$$E_1 = -e_{in}\ 1/2R_1CS + e_{in}/2\ (1 + 3/2R_1CS) \tag{9}$$

simplifying $$E_1 = e_{in}/4R_1CS + e_{in}/2 \tag{10}$$

the output frequency $f$ is then by the equation $$f = 1/t = e_{in}/16V_zR_1C \tag{11}$$

where $V_z$ is the voltage reference established by Zener diodes 62 and 64, $R_1$ is resistor 44 and resistor 40 is double the value of resistor 44 and thus indicated above as $2R_1$.

It is to be noted that the slope of the frequency dependent term in Equation No. 6 applied when transistor switch 20 is turned off and the frequency dependent term in Equation 10 applied when transistor switch 20 is on and that the terms are equal but opposite in sine. The term $e_{in}/2$ is an initial condition and has no effect on the steady state operation of the circuit.

The operation of the circuit is as follows. Assume initially that at time $T_0$ (FIG. 2) the input $e_{in}$ is zero, that the output of differential amplifier 58, $E_3$, is negative and that transistor switch 20 is turned off. Assume next that at time $T_1$ $e_{in}$ is raised to a positive value. This will cause the output $E_1$ of differential amplifier 28 to integrate downward. When, at time $T_2$, this voltage, applied to the inverting input of differential amplifier 58 becomes more negative than the nine volt reference level, $E_{3R}$ established by Zener diodes 62 and 64 the output of differential amplifier 58 switches positive which then turns on transistor switch 20 and connects resistor 44 to ground. As shown by the above equations, this causes the gain seen by the non-inverting input of differential amplifier 28 to be significantly greater than that seen by the inverting input and causes the output of differential amplifier 28 to integrate upward with a slope equal in magnitude to the previous negative going slope. When the output of differential amplifier 28 reaches the positive level of nine volts established by Zener diodes 62 and 64, at time $T_4$, the output of differential amplifier 58 switches negative and the process repeats.

It can be seen that the rate of integration and hence the frequency is proportional to the voltage level $e_{in}$. The resulting triangular wave output $E_1$ of differential amplifier 28 is truncated by a limiting circuit consisting of resistor 54 and Zener diodes 68 and 70 to provide the waveform $E_{01}$ with a plus and minus amplitude of approximately six volts. The resultant waveform produced in this manner has a low harmonic content and approaches a sinusoid. The approximation to a sinusoid is enhanced by the soft clipping features of Zener diodes 68 and 70.

It should be observed at this point that the circuit thus far described has application as a voltage controlled oscillator with square wave, triangular wave or pseudo-sinusoidal output. In addition, it has application as a simple, accurate analog to digital convertor.

The remainder of the circuit generates a second pseudo-sinusoidal output $E_{02}$ at terminal 78 locked in frequency to the basic signal $E_{01}$ appearing at terminal 56 but shifted in phase 90 electrical degrees. Differential amplifier 30 of integrator 22 operates similarly to that of differential amplifier 28 and is driven from the same input $e_{in}$ voltage across resistors 37 and 38 and has the same time constant. The difference is that transistor switch 26, the on-off condition of which determines the polarity of the slope of the output of differential amplifier 30, is driven by differential amplifier 72 in turn driven by the output $E_1$ of differential amplifier 28. The output of differential amplifier 72 is thus a square wave output $E_4$ with trailing and leading edges at times $T_3$ and $T_5$ corresponding to the midpoints of the slopes of triangular wave $E_1$. The output circuit of differential amplifier 30 includes current limiting resistor 53 and Zener diodes 80 and 82 which are of the same characteristic as Zener diodes 62 and 64 and thus establish a stable peak-to-peak level for the voltage excursions from differential amplifier 30, being approximately nine volts peak-to-peak. Truncation of the output of differential amplifier 30 is achieved through current limiting resistor 76 and Zener diodes 84 and 86 which have the same characteristic as Zener diodes 68 and 70 to provide a truncated output level of approximately six volts as shown in waveform $E_{02}$. There is thus provided a second pseudo-sinusoid output locked in frequency to the first and shifted 90°. The amplitudes of the two tinusoid outputs are independent of frequency.

Figure 3:
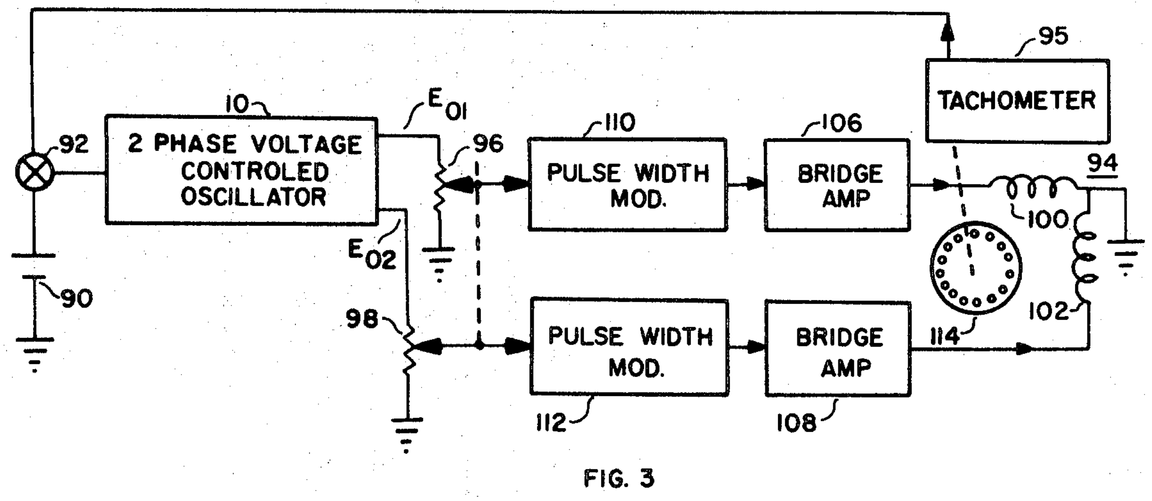
FIG. 3 is an electrical block diagram of an induction motor speed control system embodying the invention.

FIG. 3 illustrates a two phase induction motor control system in which a two-phase voltage controlled oscillator 10, shown in FIG. 1, is employed to develop alternating current signals of appropriate frequency, phase and amplitude to drive a two phase induction motor under load conditions which do not permit rapid increases in speed or high input currents. D.C. source 90 provides a reference voltage input to adder 92 representative of a voltage which if alone applied to two-phase voltage control oscillator 10 would provide, as an output, 90° displaced voltages of a frequency representative of the characteristic slip frequency of two phase induction motor 94 which produces maximum torque. Tachometer 95 driven by the shaft of motor 94 provides a second input to adder 92 to provide an input D.C. voltage proportional to actual speed of motor 94. Thus adder 92 provides a direct current output apropriate to cause two phase voltage control oscillator 10 to provide output signals of a frequency equal to actual speed of motor 94 plus a slip frequency. In order to regulate or adjust the actual input current to motor 94 to accommodate a particular rate of acceleration to a desired speed, the phased outputs $E_{01}$ and $E_{02}$ of oscillator 10 are passed through ganged potentiometers 96 and 98. As shown here, the actual inputs to the two phased windings 100 and 102 of motor 94 are supplied power from bridge amplifiers 106 and 108 which are in turn controlled by pulse width modulators 110 and 112 in accordance with signals from potentiometers 96 and 98. Pulse width modulators 110 and 112 are typically of a type disclosed in U.S. Pat. No. 3,523,228, and bridge amplifiers 106 and 108 are typically of a type disclosed in U.S. Pat. No. 3,260,912.

To consider operation of the speed control circuit and with motor 94 initially stalled, a selected input voltage is provided by source 90 through adder 92 to the input of oscillator 10. The resulting frequency out of oscillator 10 to potentiometers 96 and 98 is a slip frequency at which motor 94 is designed to develop maximum torque. The outputs of potentiometers 96 and 98 are converted to variable width pulses in pulse modulators 110 and 112 which in turn control bridge amplifiers 106 and 108 to drive windings 100 and 102 of motor 94. As motor 94 begins to turn, tachometer 95 applies a D.C. voltage proportional to speed to an input of adder 92 and the sum voltage (source 90 + speed signal) is then fed as the control input to oscillator 10. As motor 94 increases in speed, the drive frequency generated by oscillator 10 increases and pulls the rotor 114 of motor 94 to a higher speed. This allows the motor to always operate at the frequency at which it develops its maximum torque. Current limiting is accomplished by adjusting potentiometers 96 and 98 for a maximum output and by summing this output with a feedback voltage which is proportional to motor current. In order to automatically facilitate the variable voltage inputs to pulse width modulators 110 and 112 for applications where variable torque and speed are required, potentiometers 96 and 98 may be replaced by multipliers which multiply the variable frequency A.C. signal with a D.C. control signal which increases in accordance with a selected function of speed. The output of the multipliers would then be an A.C. signal with an amplitude proportional to the D.C. speed signal.

It is believed that this invention provides an improved voltage controlled oscillator which may be employed in a variety of applications as outlined above. It is constructed of few and relatively inexpensive components thus providing a substantial improvement for such type devices. As a convertor of a D.C. voltage to an A.C. voltage, with frequency as a function of voltage, it is capable of producing an output linear to a figure of 0.1 percent or better. As a source of 90° displaced A.C. signals it has not only excellent accuracy but requires only slightly more components than a single phase oscillator. Further, it enables the determination of an improved motor control system for the control of A.C. induction motors in those applications where it is required to develop high torque over the entire speed range of the motor.

What is claimed is:

1. A voltage controlled oscillator circuit comprising:

integrating means including a single electrical integrator responsive to an input electrical potential applied with respect to a circuit reference potential point for providing an output having a slope of a magnitude in a first polarity direction proportional to said input potential and including switching means responsive to a switching signal for causing said slope of said output to assume a slope of like magnitude but of opposite polarity direction; and comparator means responsive to a fixed reference potential and selected equal-amplitude but opposite-polarity outputs of said integrating means for providing said switching signals to said switching means whereby each said slope is caused to be of equal length and wherein an alternating current output is available from said output of said integrating means which varies in frequency directly with said electrical input potential;

whereby an alternating current signal is provided at the output of said single electrical integrator with respect to said circuit reference potential point.

2. A voltage controlled oscillator circuit as set forth in claim 1 further comprising:

second integrating means including a second single electrical integrator responsive to said input electrical potential for providing an output having a slope of a magnitude proportional to said electrical input potential in a first polarity direction and including second switching means responsive to a switching signal for causing said last named slope of said last named output to assume a slope of like magnitude but of opposite polarity direction; and zero crossing detection means responsive to the output of said first named electrical integrator for providing switching signals to said second switching means whereby each said slope of said output of said second single electrical integrator is of equal length and wherein an alternating current output is available from the output of said second integrator which is of like frequency and amplitude to that of the output of said first integrator but is displaced in phase by 90°.

3. A voltage controlled oscillator circuit as set forth in claim 1 wherein said comparator means comprises:

a differential amplifier;

a feedback path from the output to the non-inverting input of said differential amplifier; and a bi-potential voltage regulator connected between the non-inverting input of said differential amplifier and said circuit reference potential point; and means for connecting the output of said single electrical integrator to the inverting input of said differential amplifier and the output of said differential amplifier to said switching means.

4. A voltage controlled oscillator circuit as set forth in claim 3 wherein said single electrical integrator comprises:

a second differential amplifier;

a capacitor connected between the output and inverting input of said second differential amplifier;

a first resistor connected in series with the inverting input of said differential amplifier;

a second resistor connected in series with said first resistor between the inverting input and the non-inverting input of said second differential amplifier and a third resistor of like value to said second resistor being connected between said last named inverting input and said circuit reference potential point; and said switching means comprises a transistor switch and a fourth resistor, said fourth resistor being connected in series with the output circuit of said transistor switch between the inverting input of said second differential amplifier and said circuit reference potential point, and said switching signals are applied to the input of said transistor switch.

5. In a motor control system in which an induction motor is controlled in speed by a voltage controlled two-phased oscillator, and said system comprising:

reference voltage means for providing a selected direct current voltage representative of an optimum slip frequency at a maximum torque for a said motor;

rate means connected to the output of said motor for providing a direct current output voltage proportional to the speed of said motor;

summing means proportional to the output of said rate means and said reference voltage means for providing an output proportional to the sum of the output of said rate means and said reference voltage means;

first integrating means including a first single electrical integrator responsive to the output of said summing means for providing an output having a slope of a magnitude in a first polarity direction proportional to its input and including switching means responsive to a switching signal for causing said slope of said output to assume a slope of like magnitude of opposite polarity direction; and comparator means responsive to a fixed reference potential and and selected equal-amplitude but opposite-polarity outputs of said first integrating means for providing said switching signals to said switching means whereby each said slope is caused to be of equal length and wherein an alternating current output is provided at the output of said first integration means which varies in frequency directly with said output of said summing means;

second integrating means including a second single electrical integrator responsive to said output of said summing means for providing an output having a slope and a magnitude proportional to its input in a first polarity direction and including second switching means responsive to a switching signal for causing said last named slope of said last named output to assume a slope of like magnitude but of opposite polarity direction; and zero crossing detection means responsive to the output of said first single electrical integrator for providing switching signals to said second switching means whereby each said slope of said output of said second single electrical integrator is of equal length and wherein an alternating current output is provided from the output of said second integrator which is of like frequency and amplitude to that of the output of said first integrator but is displaced in phase by 90°.

* * * * *